United States Patent Office 2,753,343
Patented July 3, 1956

2,753,343

MALEIC ANHYDRIDE ADDUCTS OF $\Delta^{16,20}$ STEROIDS

Robert H. Mazur, Evanston, and George P. Mueller, Park Ridge, Ill., assignors, by mesne assignments, to G. D. Searle & Co., Skokie, Ill., a corporation of Delaware No Drawing. Application February 3, 1955, Serial No. 486,030

4 Claims. (Cl. 260—239.55)

The invention relates to heterocyclic addition products derived by the condensation of $\Delta^{16,20}$ steroids with maleic anhydride, and to processes for the manufacture thereof. More particularly, this invention relates to compounds of the formula

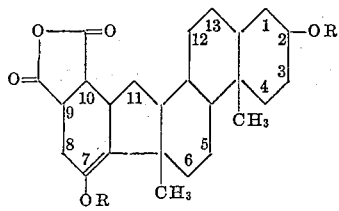

wherein R is a lower alkanoyl radical and there is a double bond appearing at one or each of the positions 1(2) and 13(13a). By "lower alkanoyl" is meant

wherein Alk is defined as an alkyl group containing fewer than 7 carbon atoms.

The compounds of this invention possess valuable pharmacological properties. Especially, the subject compounds are useful because of their regulatory effect on the cardiovascular system. For example, they are of particular importance as anti-hypertensive agents. Moreover, the compounds disclosed herein manifest powerful antibiotic activity, being capable of inhibiting the growth of a variety of recognized test organisms, among them E. coli and B. subtilis.

The compounds covered by the claims of this application are relatively insoluble in water, but may be dissolved in benzene and similar non-polar organic solvents. The subject compounds may be administered in solid form as tablets or capsules; as microcrystalline suspensions in aqueous media, they may be given parenterally.

The compounds to which this invention relates are prepared by contacting an appropriately unsaturated steroid ester of the formula

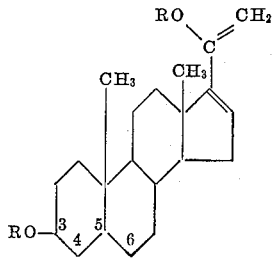

wherein R is defined as above and there is a double bond appearing at one or each of the pistons 3(4) and 5(6), with maleic anhydride, according to accepted Diels-Alder techniques, using an inert solvent such as benzene if desired. Moderate auxiliary heating serves in most instances to speed the reaction time.

The following examples will illustrate in detail certain of the adducts which constitute the present invention, and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

2,7 - diacetoxy - 4a,6a - dimethyl - 1,2,3,4,4a,4b,5,6, - 6a,8,9,10,10a,11a,11b,12 - hexadecahydro - 11H-naphtho-[2,1 - a] - fluorene - 9,10 - dicarboxylic acid anhydride.—A solution of 39 parts of 3,20-diacetoxypregna-5,16,20-triene—preparable by the method of Moffet and Weisblat, J. Amer. Chem. Soc., 74, 2183 (1952)—and 40 parts of maleic anhydride in 700 parts of benzene is heated at 90–100° C. for 1 hour and then allowed to stand at room temperatures overnight. The solution is diluted with 560 parts of ether, washed twice with water, and then dried over anhydrous sodium sulfate. Solvent is stripped by vacuum distillation, following which the residue is taken up in 160 parts of benzene and the resultant solution diluted with 465 parts of boiling cyclohexane. On cooling, 2,7-diacetoxy-4a,6a-dimethyl-1,2,3,4,4a,4b,5,6, - 6a,8,9,10,10a,11a,11b,12-hexadecahydro - 11H - naphtho-[2,1-a]-fluorene-9,10-dicarboxylic acid anyhydride is precipitated as tiny needles, M. P. 241–243° C. The product has the formula

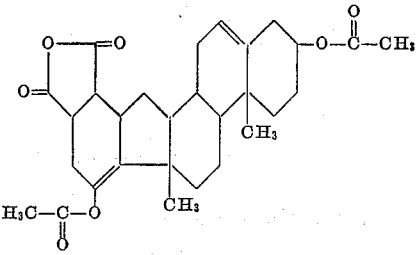

*Example 2*

A. *3,20-diacetoxypregna-3,5,16,20-tetraene.*—A solution of 20 parts of pregna-4,16-diene-3,20-dione and 2 parts of p-toluenesulfonic acid monohydrate in 460 parts of isopropenyl acetate is heated to reflux temperatures while acetone formed in process is allowed to distill off. After 7 hours, distillation is interrupted and an additional 2 parts of p-toluenesulfonic acid monohydrate and 230 parts of isopropenyl acetate is added. The solution is distilled nearly to dryness, whereupon the residue is taken up in benzene. The benzene solution is washed with aqueous sodium bicarbonate and then water, following which it is dried over anhydrous sodium sulfate and finally stripped of solvent in vacuo. The residue, crystallized from methyl alcohol and recrystallized from a mixture of benzene and cyclohexane, gives long needles of 3,20-diacetoxypregna-3,5,16,20-tetraene, M. P. 125–128° C. The product has the formula

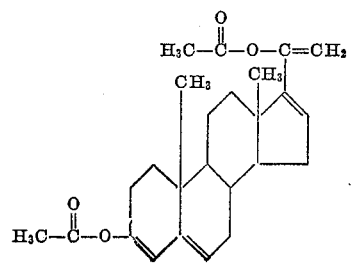

B. *2,7-diacetoxy-4a,6a-dimethyl-3,4,4a,4b,5,6,6a,8,9, - 10,10a,11a,11b,12 - tetradecahydro - 11H - naphtho - [2,1-a]γuorene-9,10-dicarboxylic acid anhydride.*—A solution of 1 part of 3,20-diacetoxypregna-3,5,16,20-tetraene and 1 part of maleic anhydride in 9 parts of benzene is heated at 90–100° C. for 1 hour and then allowed to stand at room temperatures overnight. The solution is thereupon diluted with 7 parts of ether, washed twice with water, and finally dried over anhydrous sodium sulfate. Solvent is stripped by vacuum distillation and the residue twice crystallized from a mixture of benzene and cyclohexane to give 2,7-diacetoxy-4a,6a-dimethyl-3,4,4a,4b,5,-6,6a,8,9,10,10a,11a,11b,12 - tetradecahydro - 11H-naptho-[2,1-a]fluorene-9,10-dicarboxylic acid anhydride, M. P. approximately 214° C. The product has the formula

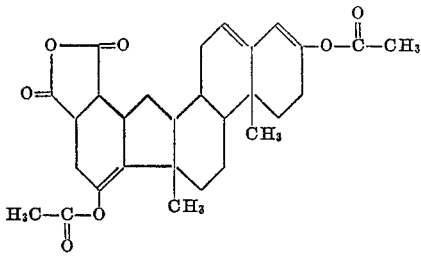

What is claimed is:

1. A compound selected from the group consisting of compounds of the formula

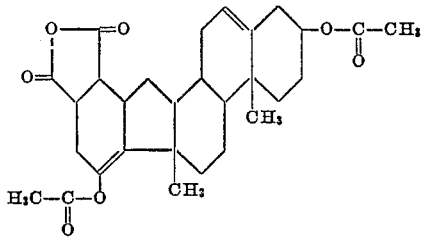

and compounds of the formula

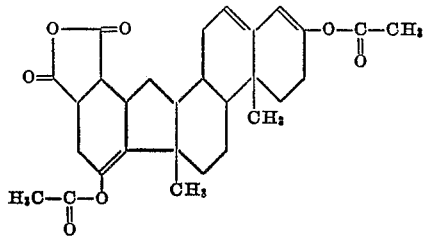

2. 2,7 - diacetoxy - 4a,6a - dimethyl - 1,2,3,4,4a,4b, - 5,6,6a,8,9,10,10a,11a,11b,12 - hexadecahydro - 11H - naphtho - [2,1 - a]fluorene - 9,10 - dicarboxylic acid anhydride.

3. 2,7 - diacetoxy - 4a,6a - dimethyl - 3,4,4a,4b,5,6, - 6a,8,9,10,10a,11a,11b,12 - tetradecahydro - 11H -naptho - [2,1 - a]fluorene - 9,10 - dicarboxylic acid anhydride.

4. In a process for preparing compounds selected from the group consisting of compounds of the formula

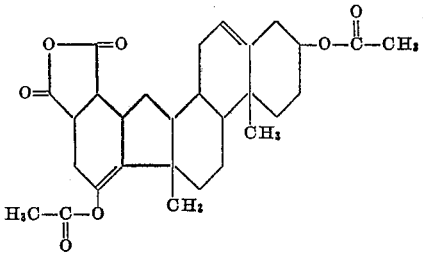

and compounds of the formula

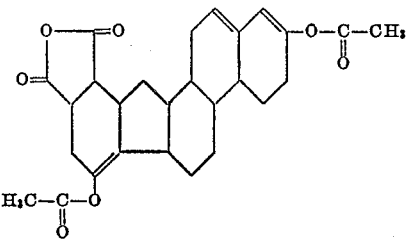

the step which comprises contacting a steroid selected from the group consisting of trienes of the formula

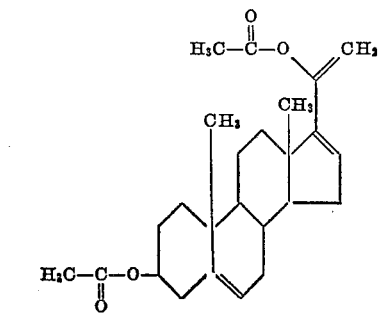

and tetraenes of the formula

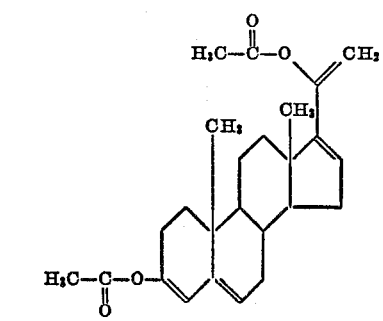

with maleic anhydride.

No references cited.